June 5, 1928.
D. P. BURNESS
MUFFLER FOR AUTOMOBILE HORNS
Filed March 15, 1927
1,672,406
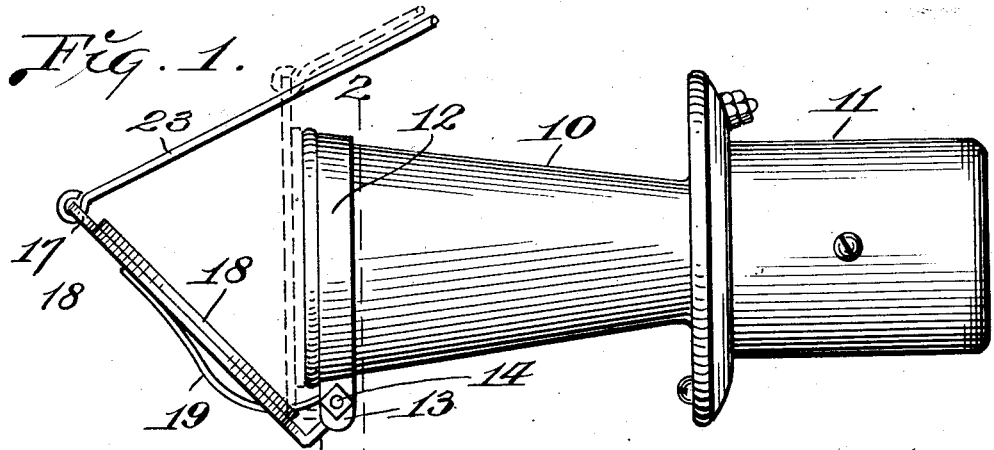
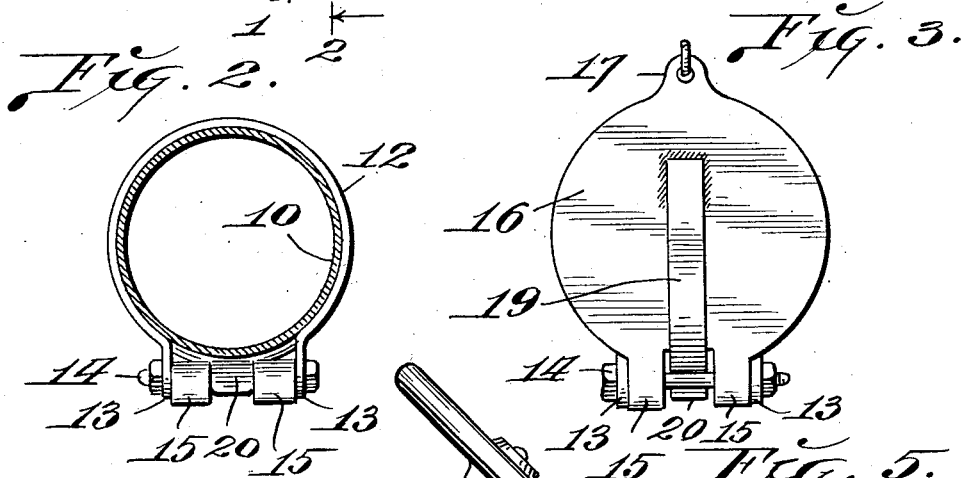
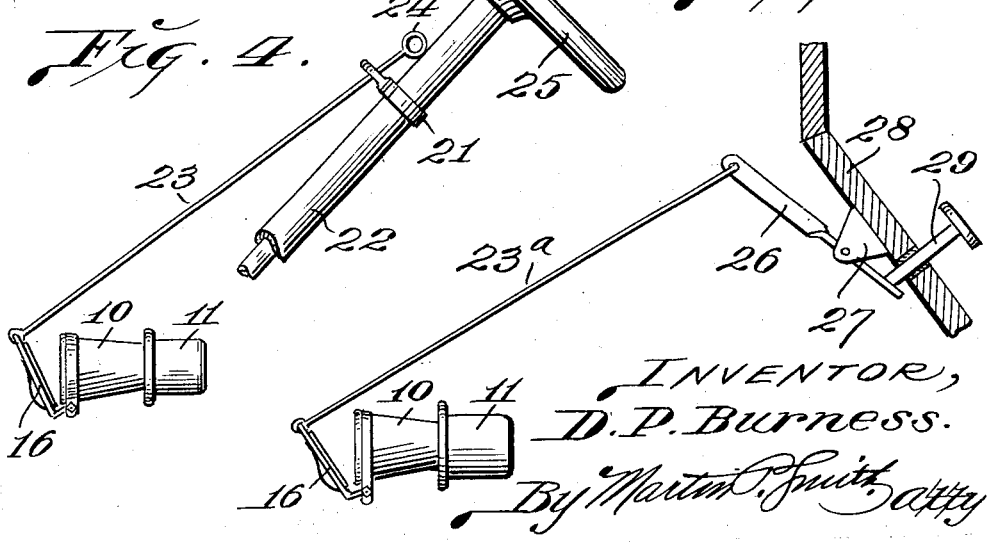
INVENTOR,
D. P. Burness.

Patented June 5, 1928.

1,672,406

UNITED STATES PATENT OFFICE.

DAVID P. BURNESS, OF LOS ANGELES, CALIFORNIA.

MUFFLER FOR AUTOMOBILE HORNS.

Application filed March 15, 1927. Serial No. 175,535.

My invention relates to a muffler for automobile horns and has for its principal objects the provision of a relatively simple device that may be attached to the forward end of an electrically operated automobile horn, and to provide simple and efficient means for changing the position of the muffling device so that the sound waves passing from the horn may be muffled and unmuffled, consequently producing an audible signal that is entirely distinctive and entirely different from the monotones that issue from the ordinary electrically driven horns when the same are operated.

A further object of my invention is to combine with an automobile horn muffler, simple and efficient means for moving said muffler toward the end of the horn to muffle the sound waves issuing therefrom and which actuating means may be operated by a foot pedal or manually from a point adjacent to the steering wheel of the vehicle.

With the foregoing and other objects in view, my invention consists in certain novel features of construction and arrangement of parts that will hereinafter be more fully described and claimed and illustrated in the accompanying drawing, in which—

Fig. 1 is an elevational view of a motor driven automobile horn and showing a muffler of my improved construction positioned for use thereon.

Fig. 2 is a cross section taken on the line 2—2 of Fig. 1.

Fig. 3 is a front elevational view of the muffler.

Fig. 4 is an elevational view of a horn equipped with my improved muffler and showing the muffler closing means extending upwardly adjacent to the steering post of the vehicle for manual operation.

Fig. 5 is an elevational view, partly in section, showing pedally actuated means that may be utilized for closing my improved muffler.

Referring by numerals to the accompanying drawing, 10 designates the body portion of an ordinary electrically driven horn, which body portion is in the form of a tapered shell or hollow cylinder. Connected to the rear or smaller end of this horn is a housing 11 that contains a small electric motor and vibratory means for producing sound waves, which travel outwardly from the horn 10 and form an audible signal.

There are various types of electrically driven automobile horns that may be obtained in the open market and to which my improved muffler may be applied.

Encircling the forward end of the horn 10, is a strap or band 12, the end portion thereof being extended downward from the bottom of the horn to form spaced ears 13 and passing through said ears is a pin or bolt 14.

Hinged to this pin or bolt between the ears 13 are substantially L-shaped ears 15 that depend from the lower portion of a disk 16, the latter being preferably formed of suitable sheet metal and provided at its top with an upwardly projecting perforated ear 17. The diameter of disk 16 is slightly greater than the diameter of the forward end of horn 10 and secured on the inner face of said disk 16, is a disk-shaped section 18 of material such as leather, fabric, or rubber. This section of material 18 functions as a pliable contact member when the muffler is swung into engagement with the open end of the horn so as to completely close the same.

Secured to the outer face of disk 16, is the upper end of a flat spring 19, the lower portion of which extends between the ears 15 and the lower end of this spring is bent to form a hook 20 that engages over the central portion of the pin or bolt 14.

Spring 19 acts to normally hold the disk 16 in an angular position away from the front end of the horn 10, as illustrated in Fig. 1, and when said disk is drawn upwardly so as to close the forward end of horn 10, as shown by dotted lines in Fig. 1, power is stored in said spring 19, and which power acts to swing the disk away from the open end of the horn when the pull on said disk is released.

Where my improved muffler is arranged for manual operation, a loop or bracket 21 is mounted on the upper portion of the steering post 22 of the equipped vehicle and the lower end of a small wire rod 23 is connected to perforated ear 17 at the top of disk 16 and the upper portion of this wire rod extends through a ring or keeper on the loop or bracket 21 and the upper end of said rod terminates in a ring 24 that is positioned a short distance below the steering wheel 25.

Where the muffler is arranged to be pedally actuated, a lever 26 is pivotally mounted on a bracket 27 that is secured to the underside of the inclined floor board 28 and the upper end of the wire rod 23ª is connected to the upper end of said lever 26.

Arranged for sliding movement through the floor board 28 is a short push rod 29, the lower end of which bears on the rear or lower end of lever 26.

In the operation of my improved automobile horn muffler, the vibratory mechanism for producing the sound waves within housing 11 is actuated by the closing of a switch, usually a push button that is mounted at the upper end of the steering post or on the steering wheel and the sound waves thus produced pass forwardly through the horn 10, thereby forming an audible signal.

By actuating the rod that is connected to the upper end of disk 17, the latter may be drawn upwardly toward the open end of the horn 10 and such action muffles the sound waves issuing from the horn, and, as the disk is permitted to swing away from the mouth of the horn, under the action of spring 19, the sound waves or tones are unmuffled, and this muffling or interruption of the sound waves produces a very distinctive audible signal when used on automobiles, motor boats and the like.

Thus it will be seen that I have provided an automobile horn muffler that is relatively simple in construction, inexpensive of manufacture and which is very effective in performing its intended functions.

It will be understood that minor changes in the size, form and construction of the various parts of my improved automobile horn muffler may be made and substituted for those herein shown and described without departing from the spirit of the invention, the scope of which is set forth in the appended claim.

I claim as my invention:

A muffler for automobile horns comprising a member adapted to be detachably applied to the forward portion of a horn, a disk hinged to said member, a section of pliable material arranged on the inner face of said disk, a spring associated with said disk and acting to normally swing the same away from the end of the horn and means connected to said disk for swinging the same against the open end of the horn.

In testimony whereof I affix my signature.

DAVID P. BURNESS.